Figure 1:
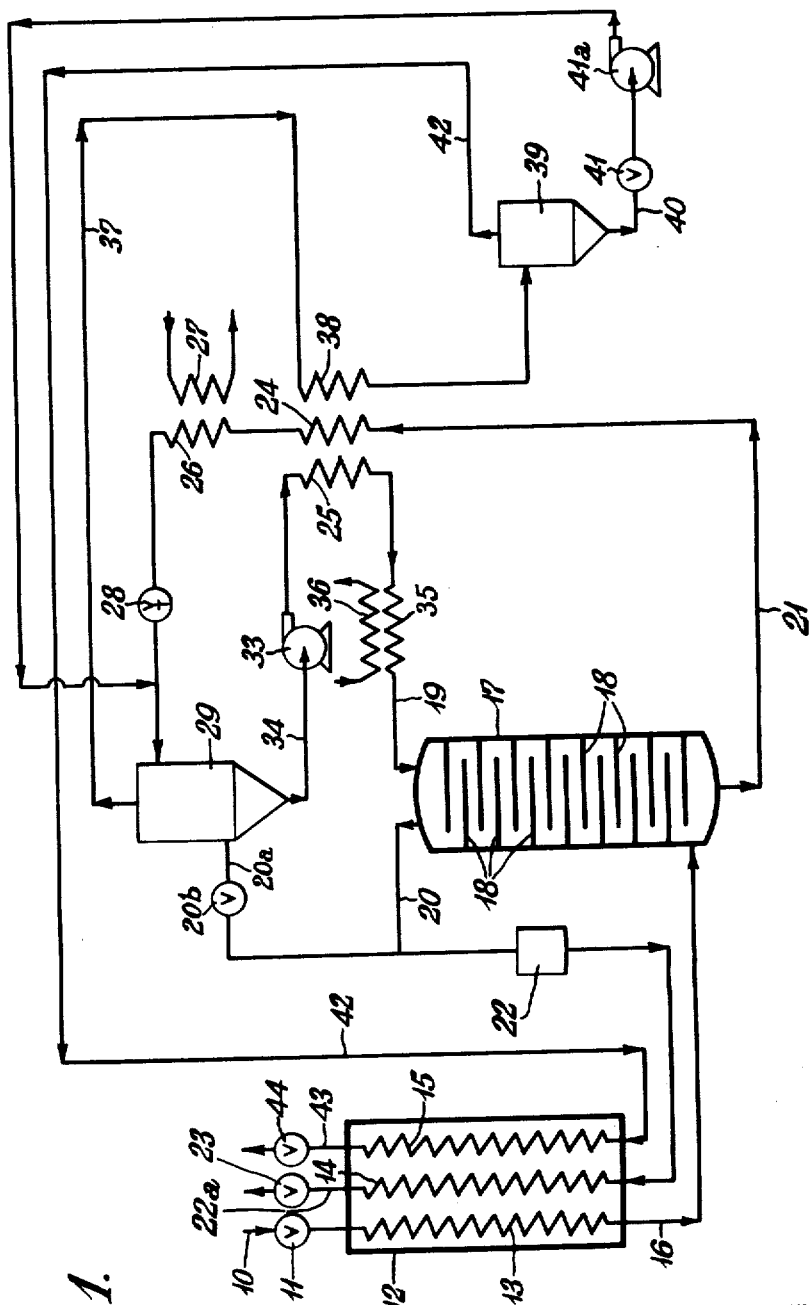

Nov. 28, 1961    C. R. BAKER ET AL    3,010,286
PROCESS AND APPARATUS FOR PURIFYING GASES
Filed July 8, 1960

INVENTORS
CHARLES R. BAKER
RICHARD S. PAUL

BY William F. Messinger
ATTORNEY

United States Patent Office 3,010,286
Patented Nov. 28, 1961

3,010,286
PROCESS AND APPARATUS FOR
PURIFYING GASES
Charles R. Baker, Kenmore, and Richard S. Paul, Grand
Island, N.Y., assignors to Union Carbide Corporation,
a corporation of New York
Filed July 8, 1960, Ser. No. 41,584
17 Claims. (Cl. 62—17)

This invention relates to improved process and apparatus for purifying gases, and more particularly for the low-temperature separation of lower boiling impurities such as nitrogen and carbon monoxide from a crude feed gas having a major constituent boiling below about −245° C., such as hydrogen, helium or neon.

A convenient source of hydrogen in large quantities is the partial oxidation of fuels such as natural gas and oil followed by the so-called "water gas shift" process. The latter converts most of the carbon monoxide produced by the partial oxidation into carbon dioxide with the simultaneous release of additional hydrogen. The gaseous crude hydrogen obtained by such methods contains carbon monoxide, carbon dioxide, methane, nitrogen and argon impurities which must be removed in order for the hydrogen to be suitable for most commercial purposes. For example, the efficiency of certain metallurgical processes such as direct reduction of iron ore is substantially improved if such contaminants are removed. Also, hydrogen intended for liquefaction must be of extremely high purity because all impurities normally encountered will solidify in the liquefier and limit the uninterrupted operation of the equipment. It has been proposed to partially accomplish the purification of hydrogen by cooling the crude hydrogen sufficiently so that the higher boiling impurities, e.g., carbon dioxide, are condensed, and then washing the lower boiling impurity-containing hydrogen with a liquid solvent such as nitrogen, methane or propane at low temperatures e.g., −170° C. so that a portion of the lower boiling impurities are absorbed therein. This purification method has several important limitations and disadvantages: For example, heavy contamination of the hydrogen product with nitrogen or methane is unavoidable if either is used as the washing liquid. If propane is used, the solubility of the lower boiling impurities in the wash liquid at −170° C. is not sufficiently high for substantially complete removal of such impurities in an economical manner. In order to obtain pure hydrogen with any of these systems, additional purification steps must be employed using separate and expensive means. Thus, commercial usage of hydrogen in large quantities has been restricted to uses which could tolerate the residual contamination left by prior art purification processes.

Other liquid washing systems have been proposed for purification of gaseous crude hydrogen, but they require relatively higher wash liquid recirculation rates and lower tray efficiencies than are desirable for a commercial process. Higher recirculation rates increase power costs, while lower tray efficiencies increase the number of actual trays needed and consequently add to the plant investment.

A principal object of the present invention is to provide a process of and apparatus for substantially complete removal of nitrogen and/or carbon monoxide impurities from crude low-boiling gases.

A further object is to provide a large scale purification process and apparatus for producing extremely high purity gas such as hydrogen, neon, helium and the like.

Another object of the present invention is to provide a highly efficient and economical process of and apparatus for washing a crude low-boiling feed gas with liquid solvents at such conditions of pressure and temperature as to effect substantially complete removal of lower boiling impurities including nitrogen and carbon monoxide.

A still further object is to provide a washing process and apparatus requiring substantially lower wash liquid recirculation rates and providing higher tray efficiencies than wash systems heretofore proposed for separating low-boiling impurities from crude hydrogen and the like.

These and other objects and advantages of this invention will be apparent from the following description and accompanying drawing in which:

FIG. 1 is a flow diagram of an exemplary system for purifying crude low-boiling gases, according to the present invention.

The present invention is predicated on the discovery that low-boiling impurities such as nitrogen and/or carbon monoxide can be efficiently and economically removed from low-boiling crude gas by washing such feed gas with a subcooled halogen-substituted hydrocarbon liquid at a low temperature below about −145° C.

More specifically, according to one process embodiment of the invention, a crude feed gas having a main constituent boiling below −245° C. and containing minor amounts of nitrogen and carbon monoxide is provided at a substantial working pressure and a low temperature below about −145° C. A subcooled halogen-substituted wash liquid is provided at about the low temperature and the working pressure, the liquid having a vapor pressure less than about one-five hundredth of the vapor pressure of nitrogen at such temperature. The cold feed stream is washed with the wash liquid thereby transferring substantially all of the lower boiling impurities to the wash liquid by absorption therein. The impurities are removed from the contaminated wash liquid and the cleaned wash liquid is recycled for re-use in the washing step.

The halogen-substituted hydrocarbon wash liquid is quite valuable, and a preferred embodiment of this invention provides a method of recovering the wash fluid evaporated during the impurity removal step. The impurities are preferably removed from the contaminated wash liquid by warming and throttling to a lower pressure so as to evaporate and substantially desorb such impurities. The evaporated impurity-wash liquid mixture is then separated into a cleaned wash liquid portion and an impurity effluent containing traces of the wash fluid. The cleaned wash liquid is recooled to about the low temperature and recycled to the washing step. The wash fluid traces are recovered from the impurity effluent by recooling such effluent sufficiently to condense at least most of the wash fluid. The latter is then returned to the evaporated impurity-wash liquid separation step for reprocessing.

It has been unexpectedly discovered that certain subcooled halogen-substituted liquids have remarkably high affinities for nitrogen and carbon monoxide at the conditions of the present process. For example, these liquids have higher solubilities than commonly used hydrocarbon-wash liquids such as ethane or propane. Furthermore, they do not possess the high vapor pressures associated with methane which preclude the latter's use due to contamination of the product effluent.

Chlorotrifluoromethane, commercially known as Ucon-13, is a preferred wash liquid, and the approximate solubility of nitrogen, carbon monoxide and hydrogen in various wash liquids is given below in terms of percent solute in the liquid at a solute partial pressure of 1 atm. The temperature is about $-184°$ C.

*Table I*

| Liquid | Ucon-13, percent | Propane-Ethane | Methane |
|---|---|---|---|
| Gas: | | | |
| $N_2$ | 12 | 2 | 14 |
| CO | 17 | 5 | 24 |
| $H_2$ | ~0.001 | ~0.01 | ~0.05 |

It is apparent from Table I that Ucon-13 combines the solubility advantage of methane with the low vapour pressure advantage of propane-ethane. The viscosity of Ucon-13 at $-180°$ C. is about 5 centipoises which means that the efficiencies in the wash column are reasonably high.

In addition to Ucon-13, the following wash liquids are suitable for employment in the present invention:

*Table II*

| Commercial Name | Formula | Freezing Point, ° C. | Boiling Point, ° C. |
|---|---|---|---|
| Ucon-22 | $CHClF_2$ | $-160$ | $-40.8$ |
| Ucon-12 | $CCl_2F_2$ | $-158$ | $-29.8$ |
| Ucon-13 B1 | $CBrF_3$ | $-168$ | $-57.8$ |
| Ucon-14 | $CF_4$ | $-183.7$ | $-128$ |
| Ucon-13 | $CClF_3$ | $-181$ | $-81.4$ |

It will be noted that all of the above-listed wash liquids contain fluorine, and all are derivatives of methane.

In a preferred embodiment, the washing step is performed at temperatures below about $-180°$ C. so as to minimize the vapor pressure of the wash fluid and contamination of the product effluent by such fluid. It will thus be apparent that in this temperature range, several of the above wash liquids would not be suitable in the pure state. However, mixtures of these higher boiling liquids with the lower boiling liquids produce eutectic points or freezing point depressions, so that such mixtures may be employed in the lower and preferred wash temperature range. For example, a wash liquid was prepared comprising 84.2% Ucon-13 and 15.8% Ucon-12, and tests showed that equilibrium data could be obtained at $-181.9°$ C. without freezing. This temperature is below the freezing point of either pure component.

Another advantage of the present halogen-substituted hydrocarbon wash liquids is that they are highly effective in removing nitrogen and carbon monoxide at moderately low temperatures whereas hydrocarbon liquids are not effective at such temperatures. For example, equilibrium test data indicates that performance of the Ucons at $-146.6°$ C. is superior to pure propane at $-181.2°$ C. This is illustrated in Table III which compares propane and the Ucons at the two temperature levels.

*Table III*

| Fluid | Temperature, ° C. | $k_{N_2}$ at 20 atm. | $L./V.=1.2\ k_{N_2}$ |
|---|---|---|---|
| 84.2% Ucon-13 / 15.8% Ucon-22 | $-181.9$ | 0.58 | 0.69 |
| 84.2% Ucon-13 / 15.8% Ucon-22 | $-146.6$ | 2.83 | 3.40 |
| Pure Ucon-13 | $-181.6$ | 0.53 | 0.63 |
| Pure Ucon-13 | $-149.4$ | 2.14 | 2.57 |
| Pure Propane | $-181.2$ | 2.96 | 3.56 |
| Pure Propane | $-144.7$ | 11.02 | 13.23 |

The table compares the equilibrium constants $k_{N_2}$ for pure nitrogen over the wash liquid, where $$k_{N_2} = \frac{\text{mol concentration } N_2 \text{ in vapor}}{\text{mol concentration } N_2 \text{ in liquid}}$$

The value of $k_{N_2}$ denotes the solubility of nitrogen in the liquid and is a direct gauge of the quantity of wash needed to purify a given quantity of gas. An examination of Table III will reveal that the mixed Ucon solution at $-146.6°$ C. and also Ucon-13 at $-149.4°$ C. are both superior to propane at $-181.2°$ C.

Although the invention will now be specifically described in terms of purifying crude hydrogen, it is equally suitable for the low-temperature separation of lower boiling impurities from other feed gases having a main constituent boiling below about $-245°$ C., as for example, helium, neon and the like.

Referring now to FIG. 1, crude hydrogen feed gas is supplied at a substantial working pressure and approximately ambient temperature. The inlet pressure is preferably between 15 and 30 atmospheres (225 to 450 p.s.i.g.) and ideally about 300 p.s.i.g. This optimum range and the preferred pressure are those which provide a favorable balance between equipment and power costs and which permit work expansion of the product for low-temperature refrigeration, if desired, to a lower pressure still high enough for economical handling of the product. If the product is work expanded and is not required under pressure, then lower delivery pressures down to essentially one atmosphere would be possible.

The crude hydrogen feed gas contains nitrogen and carbon monoxide impurities, and may also contain other impurities such as argon, oxygen, methane, ethane and propane. The crude feed gas is supplied to conduit 10 at, for example, about 300 p.s.i.g. and passed through inlet valve 11 to the heat exchange zone 12 where it is cooled to a low temperature below $-145°$ C., e.g. $-180°$ C. The crude hydrogen may have been previously processed to remove substantially all of the higher boiling impurities such as water and carbon dioxide, any remaining higher boiling impurities being removed by deposition in the feed gas passageway 13 within the heat exchange zone 12. Such deposited impurities may be periodically removed by taking the heat exchange zone out of service and purging passageway 13 by means not illustrated. The feed gas is cooled by heat exchanged with the washed product hydrogen gas in passageway 14, and a stream of desorbed lower boiling impurities in passageway 15, to be described later. The cold hydrogen free of higher boiling impurities is discharged from zone 12 through conduit 16, and passed to the bottom of wash column 17 which may include a series of superimposed sieve-type trays 18. The cold hydrogen gas rises through the column in countercurrent flow to the wash liquid which is introduced at the top of column 17 through conduit 19.

The wash liquid must be substantially subcooled preferably to a temperature approaching its freezing point, and at these conditions should also have a negligible vapor pressure. In regard to this vapor pressure requirement, a good measure of the suitability of a wash liquid is the ratio of its vapor pressure to that of the most volatile contaminant in pure form which must be removed, both vapor pressures being measured at the washing temperature. This ratio should be on the order of 1 to 500. The basis for this requirement is as follows: When a high purity hydrogen product is sought in which the maximum permissible concentration of any single impurity is measured in hundredths of a percent, then the maximum permissible contamination of the product by the wash vapors should be on the same order of magnitude or less. Obviously, little would be accomplished by the removal of several hundredths percent of an impurity from the crude hydrogen if an equal or greater amount of contamination is introduced from the wash vapors.

The washed product hydrogen effluent is discharged through conduit 20 at the top of wash column 17, and substantially all of the lower boiling impurities such as methane, nitrogen, argon, and carbon monoxide are eliminated from such product gas and contained in the impurity-rich wash liquid discharged from the bottom of the column through conduit 21. An adsorbent trap 22, for example containing activated carbon is preferably provided in conduit 20a for removing any remaining impurity traces down to a concentration of below 1 p.p.m. The refrigeration of the product hydrogen in conduit 20 is recovered by countercurrent heat exchange in passageway 14 with the crude hydrogen feed gas in passageway 13 of heat exchange zone 12. The warmed product hydrogen is discharged from such zone 12 through conduit 22a and regulating valve 23 therein, for further processing as desired.

The lower boiling impurity-containing wash liquid in conduit 21 is cleaned for subsequent recycling to the wash column 17 and treatment of incoming cold crude hydrogen therein. This cleaning is preferably accomplished by first partially warming the impurity-rich wash liquid in passageway 24 by heat exchange with cleaned higher pressure wash liquid in passageway 25, and then further rewarming such partially warmed, subcooled wash liquid in passageway 26 by heat exchange with a warmer fluid in passageway 27. A uniform temperature heat source is preferred for passageway 27 to maintain the wash liquid at a consistent warm temperature in the desorption step. By these two heating steps the impurity-rich wash liquid is warmed from approximately $-180°$ C. to about $-120°$ C. Next, the liquid is throttled through valve 28 from about the wash column operating pressure of 300 p.s.i.g. to a lower pressure, e.g. 6 p.s.i.g., and passed through conduit 21 into the separator 29. By throttling, the low boiling impurities are evaporated from the wash liquid, and the mixture is separated in vessel 29 into a cleaned wash liquid portion and an impurity effluent containing traces of the wash fluid. The vapor pressure of the wash liquid of course increases due to the warming step, but the evaporative loss after throttling is very small since the liquid is still deeply subcooled.

The hydrogen product purity attainable is dependent on the cleanliness of the wash liquid, and consequently on the effectiveness of the aforedescribed wash liquid cleaning method. A product purity in the range of 99.0–99.5% is readily attainable using the warming-throttling procedure; but if a higher product purity, e.g. 99.9% is desired, the wash liquid may be additionally stripped of substantially all of the remaining lower boiling impurities by diverting a small part of the product gas from conduit 20 to conduit 20a, and through regulating valve 20b to the base of separator 29. The product hydrogen stripping gas then rises through separator 29 in intimate contact with the descending wash liquid and facilitates removal of the remaining lower boiling impurities. Liquid-gas contact means, such as rectification trays (not shown) may be provided in the separator 29, if desired. The contaminated stripping gas is discharged through conduit 37 along with the impurity effluent.

The cleaned or lean wash liquid is withdrawn from the bottom of separator 29 by pump 33 in conduit 34 and partially recooled in passageway 25 by heat exchange with subcooled impurity-containing wash liquid in passageway 24. The partially recooled clean wash liquid is then further recooled to the washing temperature in passageway 35 by heat exchange with a refrigerant in passageway 36, and recycled by conduit 19 to the top of the wash column 17 for re-use in the cold washing step.

A low-temperature source of refrigeration must be provided at the washing column temperature level. In FIGURE 1, a refrigerant is introduced to passageway 36 in order to cool the recycling cleaned wash liquid, and the product hydrogen is provided at approximately the operating pressure of the wash column. If the product hydrogen may be delivered to the consumption point at a pressure substantially lower than that of the wash column, all or part of the product may be work expanded for refrigeration by means not illustrated.

The previously mentioned impurity effluent stream from separator 29 containing traces of the valuable halogen-substituted hydrocarbon wash fluid is vented through conduit 37 and directed to passageway 38 therein. The latter is thermally associated with the colder impurity-containing wash liquid in passageway 24, and is consequently recooled sufficiently to condense at least most of the wash liquid. A suitable temperature may, for example, be $-170°$ C. The resulting two-phase mixture is then passed to separator 39, and the condensed wash liquid trace is withdrawn through conduit 40 having control valve 41 therein. This liquid is pressurized by pump 41a and joins with the warmed and throttled impurity-containing wash fluid in conduit 21 and is passed therewith to separator 29 for processing in the previously described manner. The net result of this wash fluid recovery feature is a very small consumption of the valuable wash liquid, for example, less than 2 pounds of Ucon–13 per 1,000,000 cu. ft. of processed hydrogen gas.

The impurity-containing effluent from separator 39 is vented through conduit 42 to passageway 15 in heat exchange zone 12 where it passes in countercurrent heat exchange with, and transfers its refrigeration to the crude hydrogen feed stream in passageway 13. The warmed impurity stream emerges from the warm end of zone 12 through conduit 43 and regulating valve 44 therein, and may be further processed as desired.

The present halogen-substituted hydrocarbon wash liquids are particularly effective when hydrogen is being recovered from coke oven gas. After the usual precleaning and partial condensation steps, the coke oven gas usually contains at least 5% each of nitrogen and carbon monoxide. Table IV shows a typical feed and product composition when using Ucon–13 as the wash liquid. The results were obtained using a recirculation rate of approximately 1.3 moles of Ucon–13 per mol of hydrogen product at a pressure of 20 atmospheres and at a temperature of $-182°$ C.

*Table IV*

|  | Feed (Mol-Percent) | Product (Mol-Percent) |
|---|---|---|
| $H_2$ | 86.7 | 99.947 |
| $N_2$ | 5.8 | .023 |
| $CO$ | 6.0 | .02 |
| $CH_4$ | 1.5 | .01 |

Although preferred embodiments of the invention have been described in detail, it is contemplated that modifications of the process and apparatus may be made and that some features may be employed without others, all within the spirit and scope of the invention.

This is a continuation-in-part application of copending application S.N. 682,510, filed September 6, 1957, in the name of C. R. Baker and R. S. Paul.

What is claimed is:

1. A process for the low-temperature separation of lower boiling impurities such as at least one of nitrogen and carbon monoxide from a crude feed gas having a main constituent boiling below about $-245°$ C. including the steps of providing a feed stream including said main constituent and containing minor amounts of such lower boiling impurities at a substantial working pressure and a low temperature below about $-145°$ C.; providing a subcooled halogen-substituted hydrocarbon wash liquid at about said low temperature and said working pressure, such liquid having a vapor pressure less than about one-five hundredth of the vapor pressure of nitrogen at such temperature; washing the cold feed stream with the halogen-substituted hydrocarbon wash liquid thereby transferring substantially all of the lower boiling impurities to the wash liquid by absorption therein; removing the lower boiling impurities from the contaminated wash liquid and recycling such cleaned wash liquid for re-use in the washing step.

2. A process according to claim 1 in which said feed stream is cooled to said low temperature by heat-exchange with at least a first colder fluid in a heat exchange zone, a product gas effluent is recovered from the washing step, and at least most of the product gas is passed in heat exchange with the feed stream as said first colder fluid.

3. A process according to claim 1 in which the lower boiling impurities are removed from the contaminated wash liquid by warming and throttling such wash liquid to a lower pressure so as to evaporate and substantially desorb such impurities therefrom, and the cleaned wash liquid is recooled to about said low temperature before said recycling to the washing step.

4. A process according to claim 2 in which the lower boiling impurities are removed from the contaminated wash liquid by warming and throttling such wash liquid to a lower pressure so as to evaporate and desorb at least part of such impurities therefrom, a portion of said product gas effluent is diverted and contacted with the warmed and throttled wash liquid so as to strip substantially all of the remaining lower boiling impurities therefrom, and the resulting cleaned wash liquid is recooled to about said low temperature before said recycling to the washing step by heat exchange with the subcooled contaminated wash liquid.

5. A process for the low-temperature separation of lower boiling impurities such as least one of nitrogen and carbon monoxide from a crude feed gas having a main constituent boiling below about −245° C. including the steps of providing a feed stream including said main constituent and containing minor amounts of such lower boiling impurities at a substantial working pressure and a low temperature below about −145° C.; providing a subcooled halogen-substituted hydrocarbon wash liquid at about said low temperature and said working pressure, such liquid having a vapor pressure less than about one-five hundredth of the vapor pressure of nitrogen at such temperature; washing the cold feed stream with the halogen-substituted hydrocarbon wash liquid thereby transferring substantially all of the lower boiling impurities to the wash liquid by absorption therein; removing the lower boiling impurities from the contaminated wash liquid by warming and throttling such liquid so as to evaporate and substantially desorb the impurities therefrom; separating the evaporated impurity-wash liquid mixture into a cleaned wash liquid portion and an impurity effluent containing traces of the halogen-substituted hydrocarbon wash fluid; recooling said cleaned wash liquid portion to about said low temperature and recycling such recooled liquid for re-use in the washing step; recovering the wash fluid traces from said impurity effluent by recooling such effluent sufficiently to condense at least most of such wash fluid, and returning the condensed wash fluid traces to the evaporated impurity-wash liquid separation step.

6. A process according to claim 5 in which the impurity effluent is recooled by heat exchange with the cold contaminated wash liquid thereby simultaneously effecting said warming of such liquid.

7. A process according to claim 1 in which said halogen-substituted hydrocarbon wash liquid is chlorotrifluoromethane.

8. A process according to claim 1 in which said halogen-substituted hydrocarbon wash liquid is tetrafluoromethane.

9. A process according to claim 1 in which said halogen-substituted hydrocarbon wash liquid is a mixture of chlorotrifluoromethane and dichlorodifluoromethane.

10. A process according to claim 1 in which said feed stream and said subcooled halogen-substituted hydrocarbon wash liquid are provided at a temperature below about −180° C.

11. A process according to claim 1 in which said subcooled halogen-substituted hydrocarbon wash liquid is chlorotrifluoromethane, and said feed stream and wash stream are provided at a temperature below about −180° C.

12. Apparatus for the low-temperature separation of lower boiling impurities such as at least one of nitrogen and carbon monoxide from a feed gas having a main constituent boiling below about −245° C. including means by which said feed stream containing minor amounts of said lower boiling impurities is provided at a higher pressure; a heat exchange zone for cooling said feed gas stream to a low temperature below −145° C.; means for washing the cooled feed gas at about said low temperature and said higher pressure with a subcooled halogen-substituted hydrocarbon wash liquid having a vapor pressure less than approximately one-five hundredth of the vapor pressure of nitrogen at the washing temperature and washing pressure, thereby transferring substantially all of the nitrogen and carbon monoxide low boiling impurities to the wash liquid by absorption therein; means for recovering a product gas effluent from the washing means; means for passing at least part of such product effluent through said heat exchange zone to cool the feed gas; means for warming and throttling the lower boiling impurity containing wash liquid to a lower pressure so as to evaporate and substantially desorb such impurities therefrom; means for separating the evaporated lower boiling impurities from the warmed and throttled wash liquid so as to form a cleaned wash liquid portion and an impurity effluent containing traces of the wash fluid; means for recooling the cleaned wash liquid to about said low temperature; means for recycling the recooled and cleaned wash liquid for re-use in said washing means; means for recooling said impurity effluent sufficiently to condense at least most of the wash fluid traces therein; means for separating the condensed wash liquid traces from said impurity effluent; and means for returning such liquid traces to the means for separating the lower boiling impurities from the warmed and throttled wash liquid.

13. Apparatus according to claim 12 wherein means are provided for passing said impurity effluent from the separating means to said heat exchange zone for cooling of said feed gas stream and simultaneous warming of such impurity effluent.

14. Apparatus according to chain 12 wherein said means for recooling the cleaned wash liquid and said means for recooling said impurity effluent constitute at least part of said means for warming the lower boiling impurity containing wash liquid.

15. A process for the low-temperature separation of lower boiling impurities such as at least one of nitrogen and carbon monoxide from a crude feed gas having a main constituent boiling below about −245° C. including the steps of providing a feed stream including said main constituent and containing minor amounts of such lower boiling impurities at a substantial working pressure and a low temperature below about −145° C.; providing a subcooled halogen-substituted, fluorine-containing hydrocarbon wash liquid at about said low temperature and said working pressure, such liquid having a vapor pressure less than about one five-hundredth of the vapor pressure of nitrogen at such temperature; washing the cold feed stream with the wash liquid thereby transferring substantially all of the lower boiling impurities to the wash liquid by absorption therein; removing the lower boiling impurities from the contaminated wash liquid and re-cycling such cleaned wash liquid for re-use in the washing step.

16. A process for the low-temperature separation of lower boiling impurities such as at least one of nitrogen and carbon monoxide from a crude feed gas having a main constituent boiling below about −245° C. including the steps of providing a feed stream including said main constituent and containing minor amounts of such lower boiling impurities at a substantial working pressure and a low temperature below about −145° C.; providing a subcooled halogen-substituted methane derived wash liquid at about said low temperature and said working pressure, such liquid having a vapor pressure less than about one five-hundredth of the vapor pressure of nitrogen at such temperature; washing the cold feed stream with the halogen-substituted methane derived wash liquid thereby transferring substantially all of the lower boiling impurities to the wash liquid by absorption therein; removing the lower boiling impurities from the contaminated wash liquid and recycling such cleaned wash liquid for re-use in the washing step.

17. A process according to claim 1 in which a product gas effluent is recovered from the washing step, and such product is passed through an adsorption zone for removal of any remaining impurity traces.

References Cited in the file of this patent

UNITED STATES PATENTS

| | | |
|---|---|---|
| 1,773,012 | Schufton | Aug. 12, 1930 |
| 2,540,905 | Neubauer et al. | Feb. 6, 1951 |
| 2,826,266 | Hachmuth et al. | Mar. 11, 1958 |
| 2,875,586 | Pohl | Mar. 3, 1959 |
| 2,880,591 | Kwauk | Apr. 7, 1959 |
| 2,956,410 | Palazzo | Oct. 18, 1960 |

UNITED STATES PATENT OFFICE
CERTIFICATE OF CORRECTION

Patent No. 3,010,286                                      November 28, 1961

Charles R. Baker et al.

It is hereby certified that error appears in the above numbered patent requiring correction and that the said Letters Patent should read as corrected below.

Column 6, line 75, for "-1450 C." read -- 145° C. --.

Signed and sealed this 17th day of April 1962.

(SEAL)
Attest:

ESTON G. JOHNSON                                     DAVID L. LADD

Attesting Officer                                          Commissioner of Patents